(12) United States Patent
Shih et al.

(10) Patent No.: US 8,677,772 B2
(45) Date of Patent: Mar. 25, 2014

(54) AIR CONDITIONING SYSTEM FOR A VEHICLE

(75) Inventors: Chun-Yu Shih, Lugong (TW); Po-Hsu Lin, Lugong (TW)

(73) Assignee: Automotive Research & Testing Center (TW)

( * ) Notice: Subject to any disclaimer, the term of this patent is extended or adjusted under 35 U.S.C. 154(b) by 553 days.

(21) Appl. No.: 13/080,442

(22) Filed: Apr. 5, 2011

(65) Prior Publication Data

US 2012/0159978 A1    Jun. 28, 2012

(51) Int. Cl.
   *F25B 49/00* (2006.01)
(52) U.S. Cl.
   USPC ............. 62/196.1; 62/186; 62/200; 62/259.2
(58) Field of Classification Search
   USPC ............. 62/159, 160, 180, 186, 196.1, 196.3, 62/199, 200, 259.2
   See application file for complete search history.

(56) References Cited

U.S. PATENT DOCUMENTS

| | | | |
|---|---|---|---|
| 5,878,589 A | 3/1999 | Tanaka et al. | |
| 7,096,683 B2 * | 8/2006 | Smith | 62/200 |
| 7,152,417 B2 * | 12/2006 | Morishita et al. | 62/186 |
| 2006/0080986 A1 * | 4/2006 | Inoue | 62/259.2 |
| 2008/0236181 A1 * | 10/2008 | Zhu et al. | 62/239 |
| 2009/0071178 A1 * | 3/2009 | Major et al. | 62/239 |
| 2009/0249807 A1 | 10/2009 | Nemesh et al. | |

\* cited by examiner

*Primary Examiner* — Marc Norman
(74) *Attorney, Agent, or Firm* — Schwegman Lundberg & Woessner, P.A.

(57) ABSTRACT

An air conditioning system for a vehicle includes a cabin air conditioning unit, a heat management unit, a temperature detecting unit, a switching unit, and a control unit. The control unit is operable to control operations of the cabin air conditioning unit, the switching unit, and the heat management unit according to temperature detection results from the temperature detecting unit, thereby regulating temperature of at least one of a passenger cabin and a heat generating component, which generates waste heat during operation thereof, of the vehicle.

19 Claims, 12 Drawing Sheets

AIR CONDITIONING SYSTEM FOR A VEHICLE

BACKGROUND OF THE INVENTION

1. Field of the Invention

The present invention relates to an air conditioning system, more particularly to an air conditioning system for a vehicle.

2. Description of the Related Art

The performance of equipment of an electric motor vehicle depends on the weather and the environment, and is relatively great when the equipment operates under a specified temperature range. For example, efficiency of a battery of the electric motor vehicle is significant for endurance of the electric motor vehicle, so that the battery should operate under a specified temperature range in order to maintain relatively greater efficiency thereof. However, an environment temperature surrounding the battery may affect the operation of the battery. Therefore, in the development of the electric motor vehicle, management and control of the temperature of the battery and the vehicle equipment are critical. Use of the air conditioning system for implementing the heat management of the battery and the vehicle equipment is currently a main focus in the industry.

Generally, electrical heating and water cooling are used in the conventional heat management of the battery for controlling the temperature of the battery, but these two methods both consume a lot of energy. There is also another method of controlling the temperature of the battery through ventilation, but such ventilation cannot effectively control the temperature of the battery. Regarding the heating system of the electrical motor vehicle, it is usually configured to heat the cabin by electrical heating. For the efficiency of the heat exchanger and the electrical heater of the heating system, it is required to consume additional electrical energy stored in the battery.

According to U.S. Patent Application Publication No. 2009/0249807, an HVAC and battery thermal management for a vehicle uses a coolant pump for pumping a coolant through a coolant loop for cooling a battery pack of a vehicle. Further, a battery internal heater or other suitable heater, such as a coolant heater in the coolant loop may be employed to heat the battery pack. Although this U.S. patent application discloses the HVAC and battery thermal management capable of providing relatively greater efficiency, an additional heater is required for heating the battery pack.

U.S. Pat. No. 5,878,589 discloses a vehicular air conditioning system for electric vehicles. In such vehicular air conditioning system, the waste heat generated from a heating part in a vehicle is recovered and extracted by a coolant for heat exchange while suppressing an increase in the power consumption. However, the layout of the vehicular air conditioning system is relatively complicated and is hard to be assembled.

SUMMARY OF THE INVENTION

Therefore, an object of the present invention is to provide an air conditioning system for a vehicle that is capable of air conditioning for a passenger cabin of a vehicle and that is further capable of heat management for other heat generating components of the vehicle.

Accordingly, an air conditioning system of this invention is configured for a vehicle including a passenger cabin and a heat generating component that generates waste heat during operation thereof. The air conditioning system includes a cabin air conditioning unit, a heat management unit, a temperature detecting unit, a switching unit, and a control unit.

The cabin air conditioning unit includes a compressor, a condenser, an evaporator, a four-way control valve for connecting the compressor to the condenser and the evaporator and for controlling direction of coolant flow through the compressor, and a first expansion valve connected between the condenser and the evaporator for controlling the coolant flow therebetween.

The heat management unit includes a ventilation duct, a ventilation device, a duct switching device, a heat exchanger, and a second expansion valve. The ventilation duct is formed with spaced apart first and second internal ports in flow communication with the passenger cabin, and an external port spaced apart from the first internal port and in flow communication with an exterior of the passenger cabin. The ventilation device is disposed adjacent to the first internal port for generating an air flow in the ventilation duct. The duct switching device is disposed to block air flow through a selected one of the external port and the second internal port. The heat exchanger is configured for heat exchange with the air flow in the ventilation duct. The heat generating component is to be disposed relative to the heat management unit for heat exchange with the air flow in the ventilation duct. The second expansion valve is connected between the heat exchanger and the cabin air conditioning unit for controlling the coolant flow therebetween.

The temperature detecting unit is for detecting at least one of ambient temperature and temperature of at least one of the cabin air conditioning unit, the heat management unit, the heat generating component, and the passenger cabin.

The switching unit is operable to enable and disable coolant flow between at least one pair of the condenser and the evaporator, the condenser and the four-way control valve, the evaporator and the four-way control valve, and the heat exchanger and the cabin air conditioning unit. The switching unit includes a bypass device across the second expansion valve to enable coolant flow from the cabin air conditioning unit toward the heat exchanger through at least one of the second expansion valve and the bypass device.

The control unit is connected to the cabin air conditioning unit, the heat management unit, the temperature detecting unit and the switching unit, and is operable to control operations of the cabin air conditioning unit, the switching unit, and the ventilation device and the duct switching device of the heat management unit according to temperature detection results from the temperature detecting unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
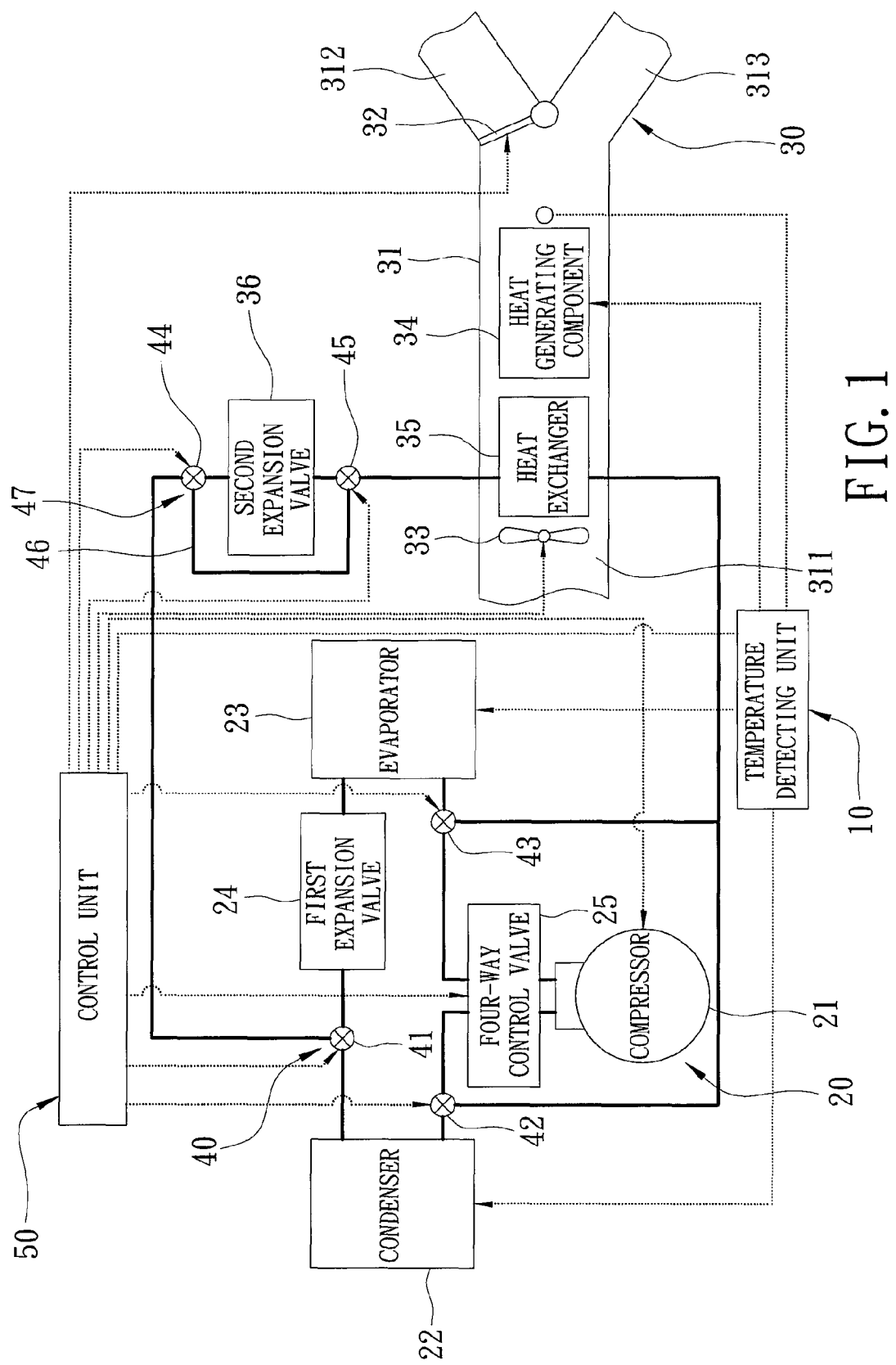
FIG. 1 is a schematic block diagram of a preferred embodiment of an air conditioning system for a vehicle according to the present invention.

Referring to FIG. 1, the preferred embodiment of an air conditioning system for an electric motor vehicle according to this invention includes a temperature detecting unit 10, a cabin air conditioning unit 20, a heat management unit 30, a switching unit 40, and a control unit 50.

The temperature detecting unit 10 is configured for detecting ambient temperature and temperature of the cabin air conditioning unit 20, the heat management unit 30, and a heat generating component 34 and a passenger cabin of the electric motor vehicle. The heat generating component 34 generates waste heat during operation thereof, and has a high temperature limit and a low temperature limit. For example, the heat generating component 34 may be a battery for providing electricity to the electric motor vehicle. It should be noted that, in other embodiments, the heat generating component 34 may be a motor, a driver, a frequency inverter, or any other mechanical or electrical device that generates waste heat during operation thereof.

The cabin air conditioning unit 20 includes a compressor 21, a condenser 22, an evaporator 23, a first expansion valve 24, and a four-way control valve 25. The first expansion valve 24 is connected between the condenser 22 and the evaporator 23 for controlling the coolant flow therebetween. The four-way control valve 25 is configured for connecting the compressor 21 to the condenser 22 and the evaporator 23, and for controlling direction of coolant flow through the compressor 21. In practice, the first expansion valve 24 may be an electric expansion valve, a thermostatic expansion valve, an orifice tube, or other types of devices for controlling coolant flow and for reducing pressure. In this embodiment, the first expansion valve 24 is an electric expansion valve, and the four-way control valve 25 is a four-port solenoid valve operable to change fluid communication among ports thereof.

The cabin air conditioning unit 20 may operate among a cabin cooling mode (see FIGS. 2 to 4), a cabin heating mode (see FIGS. 5 to 8), and a heat management priority mode (see FIGS. 9 to 12). In the cabin cooling mode, the four-way control valve 25 is operable to direct the coolant flow in the cabin air conditioning unit 20 from the compressor 21 to flow in sequence through the condenser 22, the first expansion valve 24, the evaporator 23 and back to the compressor 21 through the four-way control valve 25. In the cabin heating mode, the direction of the coolant flow in the cabin air conditioning unit 20 is opposite to the direction of the coolant flow in the cabin cooling mode. Since the operation of the four-way control valve 25 for directing the coolant flow is well known to those skilled in the art, further details thereof will be omitted herein for the sake of brevity.

The heat management unit 30 includes a ventilation duct 31, a ventilation device 33, a duct switching device 32, a heat exchanger 35, and a second expansion valve 36 connected between the heat exchanger 35 and the cabin air conditioning unit 20 for controlling the coolant flow therebetween. The ventilation device 33, the duct switching device 32, and the heat exchanger 35 are disposed in the ventilation duct 31 in this embodiment. In particular, the heat exchanger 35 is disposed between the ventilation device 33 and the duct switching device 32, and the heat generating component 34 of the electric motor vehicle is to be disposed between the heat exchanger 35 and the duct switching device 32 inside the ventilation duct 31.

The ventilation duct 31 is formed with a forward first internal port 311 in flow communication with the passenger cabin of the vehicle, a rearward second internal port 312 spaced apart from the first internal port 311 and in flow communication with the passenger cabin, and a rearward external port 313 spaced apart from the first internal port 311 and in flow communication with an exterior of the passenger cabin. The ventilation duct 31 is typically disposed underneath a chassis of the vehicle. The ventilation device 33 is disposed adjacent to the first internal port 311 for generating an air flow in the ventilation duct 31, and is a fan in this embodiment. The duct switching device 32 is disposed between the second internal port 312 and the external port 313, and is movable between an internal recycle position (see FIG. 2) for blocking air flow through the external port 313 and an external recycle position (see FIG. 3) for blocking air flow through the second internal port 312. In this embodiment, the duct switching device 32 is an electric valve. The heat exchanger 35 and the heat generating component 34 are configured for heat exchange with the air flow in the ventilation duct 31. In practice, the second expansion valve 36 may be an electric expansion valve, a thermostatic expansion valve, an orifice tube, or other types of devices for controlling coolant flow and for reducing pressure. In this embodiment, the second expansion valve 36 is an electric expansion valve.

The switching unit 40 is operable to enable and disable coolant flow between the condenser 22 and the evaporator 23, the condenser 22 and the four-way control valve 25, the evaporator 23 and the four-way control valve 25, and the heat exchanger 35 and the cabin air conditioning unit 20. In this embodiment, the switching unit 40 includes a first valve device 41 connected among the condenser 22, the first expansion valve 24 and the second expansion valve 36, a second valve device 42 connected among the condenser 22, the four-way control valve 25 and the heat exchanger 35, a third valve device 43 connected among the evaporator 23, the four-way control valve 25 and the heat exchanger 35, and a bypass device 47 across the second expansion valve 36. In this embodiment, the bypass device 47 includes a fourth valve device 44 connected between the first valve device 41 and the second expansion valve 36, and a fifth valve device 45 connected between the heat exchanger 35 and the second expansion valve 36 and connected to the fourth valve device 44 through a bypass tube 46. Each of the first to fifth valve devices 41 to 45 is a three-port solenoid valve in this embodiment, but may be configured as a set of valves in other embodiments of this invention.

The control unit 50 is connected to the temperature detecting unit 10, the cabin air conditioning unit 20, the heat management unit 30 and the switching unit 40, and is operable to control operations of the cabin air conditioning unit 20, the switching unit 40, and the ventilation device 33 and the duct switching device 32 of the heat management unit 30 according to temperature detection results from the temperature detecting unit 10.

When an air conditioning button in the electric motor vehicle is pressed, the compressor 21 is operable to drive the coolant flow, and the temperature detecting unit 10 is operable to detect the ambient temperature and the temperature of the cabin air conditioning unit 20, the heat management unit 30, the heat generating component 34, and the passenger cabin. Further, an operation mode button is used for selection among various operation modes of the air conditioning system. When an air conditioning mode is selected, the control unit 50 is configured to control the cabin air conditioning unit 20 to automatically operate between the cabin cooling mode and the cabin heating mode so as to control the temperature of the passenger cabin. When the heat management priority mode is selected, the control unit 50 is configured to prioritize control of the temperature of the heat generating component 34 over the temperature of the passenger cabin.

FIGS. 2 to 8 show various functions under the air conditioning mode. When the control unit 50 determines from the temperature detection results from the temperature detecting unit 10 that the ambient temperature is not lower than a predetermined high temperature value, the control unit 50 is configured to control the cabin air conditioning unit 20 to operate in the cabin cooling mode (see FIGS. 2 to 4). When the control unit 50 determines that the ambient temperature is lower than a predetermined low temperature value, the control unit 50 is configured to control the cabin air conditioning unit 20 to operate in the cabin heating mode (see FIGS. 5 to 8).

In the cabin cooling mode, when it is determined that the temperature of the heat generating component 34 is not lower than the high temperature limit, the control unit 50 is configured to control the cabin air conditioning unit 20, the heat management unit 30, and the switching unit 40 to operate in a component cooling function for cooling the heat generating component 34 and the passenger cabin. In this function, as shown in FIGS. 2 and 3, the control unit 50 is configured to control the four-way control valve 25 to direct the coolant flow from the compressor 21 toward the second valve device 42, to control the second valve device 42 to enable the coolant flow from the four-way control valve 25 toward the condenser 22 and to disable the coolant flow between the four-way control valve 25 and the heat exchanger 35, to control the first valve device 41 to enable the coolant flow from the condenser 22 toward the evaporator 23 and the bypass device 47, to control the bypass device 47 to enable the coolant flow from the first valve device 41 toward the heat exchanger 35 only through the second expansion valve 36, and to control the third valve device 43 to enable the coolant flow from the evaporator 23 and the heat exchanger 35 toward the four-way control valve 25.

Figure 2:
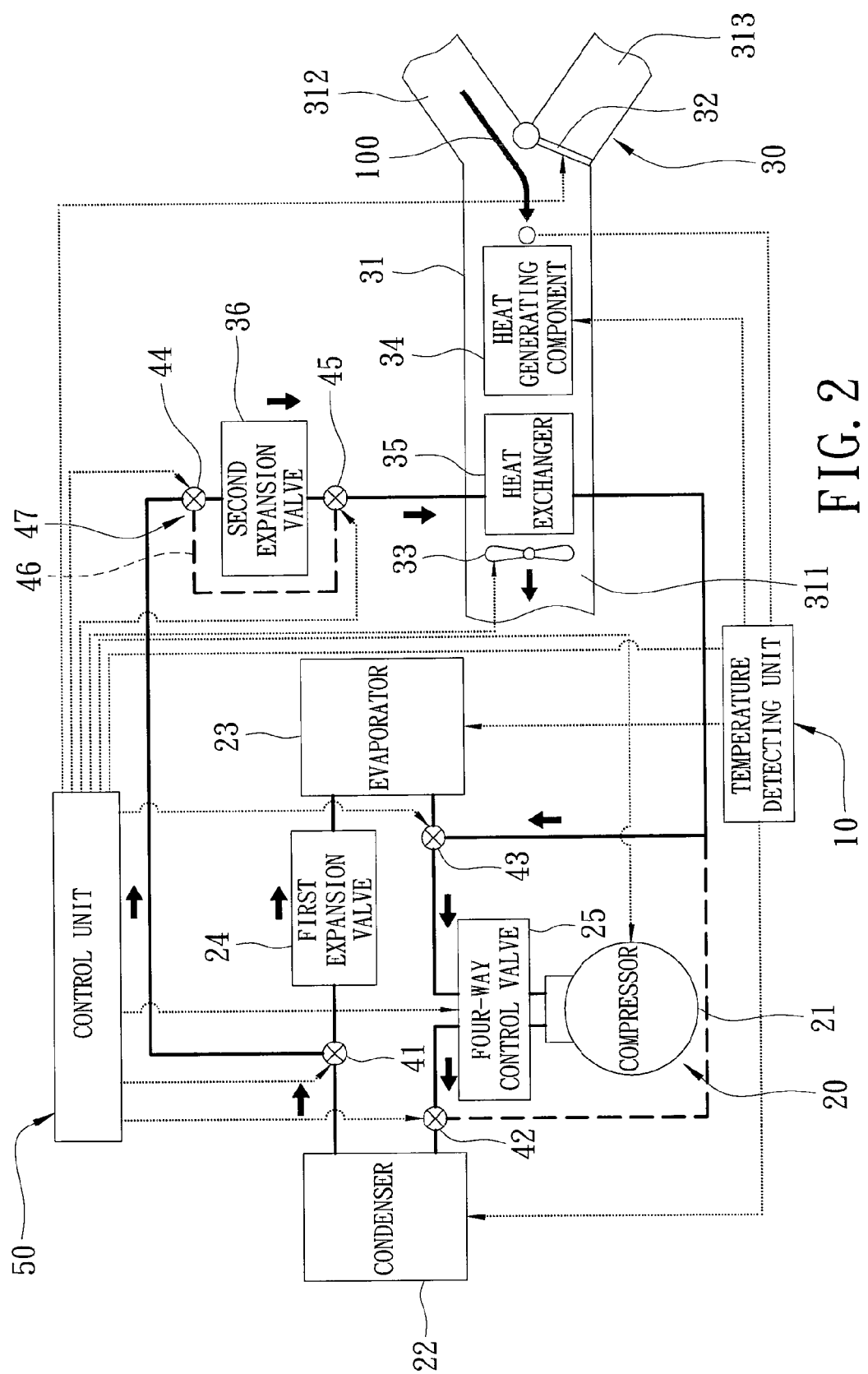
FIGS. 2 and 3 are the schematic block diagram of FIG. 1 illustrating the air conditioning system operating in a cabin cooling mode for cooling a passenger cabin and a heat generating component of the vehicle.
Figure 3:
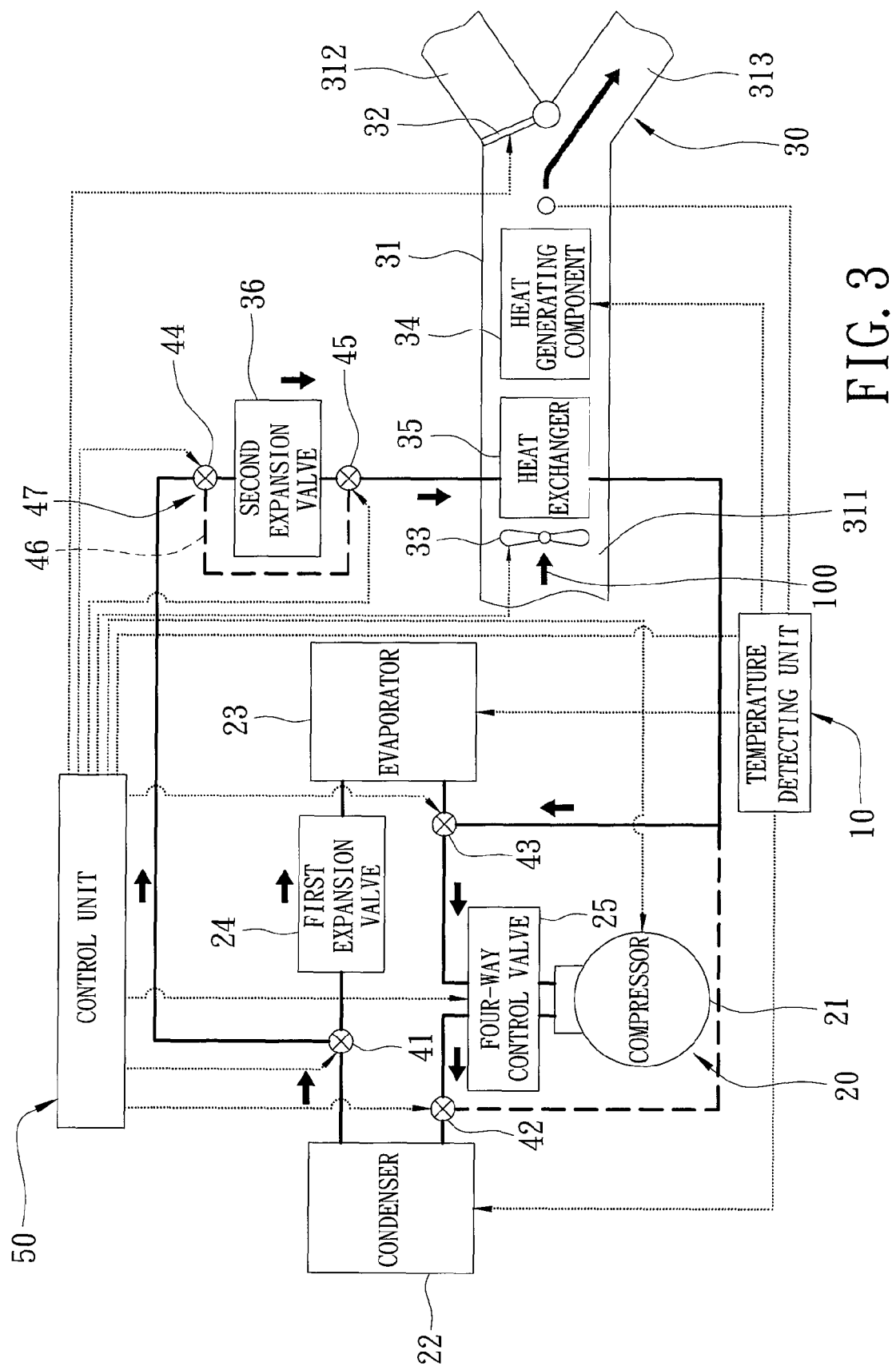

Moreover, in the component cooling function of the cabin cooling mode, when it is further determined that coolant temperature at an outlet end of the evaporator 23 minus coolant temperature at an inlet end of the evaporator 23 is lower than a predetermined value (such as 5° C.), the control unit 50 is further configured to control the duct switching device 32 to move to the internal recycle position for blocking the external port 313, and to control the ventilation device 33 to generate an air flow 100 in the ventilation duct 31 from the second internal port 312 toward the first internal port 311 as shown in FIG. 2. Thus, the air flow 100 in the ventilation duct 31 is used for cooling the heat generating component 34, and the heat exchanger 35 may exchange the waste heat with the air flow 100 from the heat generating component 34 so as to increase the coolant temperature from the heat exchanger 35 toward the compressor 21. Alternatively, when it is further determined that the coolant temperature at the outlet end of the evaporator 23 minus the coolant temperature at the inlet end of the evaporator 23 is not lower than the predetermined value, the control unit 50 is further configured to control the duct switching device 32 to move to the external recycle position for blocking the second internal port 312, and to control the ventilation device 33 to generate an air flow 100 in the ventilation duct 31 from the first internal port 311 toward the external port 313 as shown in FIG. 3. Thus, the air flow 100 in the ventilation duct 31 through the heat exchanger 35 is used for cooling the heat generating component 34, and flows to the exterior of the passenger cabin with the waste heat from the heat generating component 34 such that the waste heat may be used for generating electricity via a conventional thermoelectric converter (not shown).

In the component cooling function of the cabin cooling mode, the coolant in the cabin air conditioning unit 20 flows into the heat exchanger 35 of the heat management unit 30 such that the heat exchanger 35 is operable to serve as an evaporator. Thus, the air flow 100 may take the waste heat from the heat generating component 34 to the heat exchanger 35 and the coolant in the heat exchanger 35 may take the waste heat away (see FIG. 2), or the heat exchanger 35 may cool the air flow 100 for subsequently cooling the heat generating component (see FIG. 3).

Figure 4:
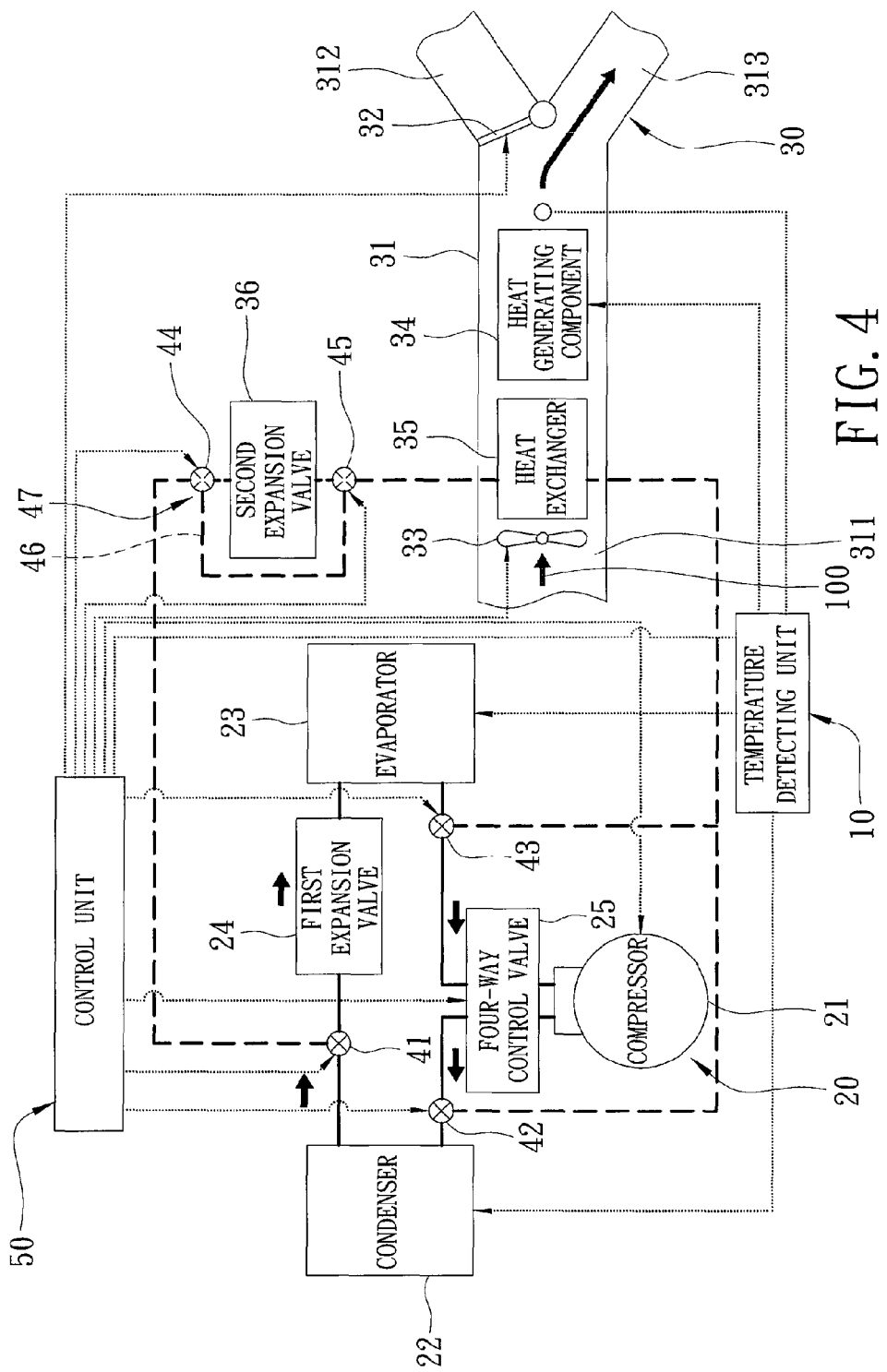
FIG. 4 is the schematic block diagram of FIG. 1 illustrating the air conditioning system operating in the cabin cooling mode for cooling the passenger cabin.

In the cabin cooling mode, when it is determined that the temperature of the heat generating component 34 is lower than the high temperature limit, the control unit 50 is configured to control the cabin air conditioning unit 20, the heat management unit 30, and the switching unit 40 to operate in a cabin cooling function for regulating the temperature of the passenger cabin. In this function, as shown in FIG. 4, the control unit is configured to control the four-way control valve 25 to direct the coolant flow from the compressor 21 toward the second valve device 42, to control the second valve device 42 to enable the coolant flow from the four-way control valve 25 toward the condenser 22, to control the first valve device 41 to enable the coolant flow from the condenser 22 toward the evaporator 23, to control the third valve device 43 to enable the coolant flow from the evaporator 23 toward the four-way control valve 25, and to control the switching unit 40 to disable the coolant flow between the heat exchanger 35 and the cabin air conditioning unit 20.

Moreover, in the cabin cooling function of the cabin cooling mode, when it is further determined that the temperature of the heat generating component 34 is not lower than the low temperature limit, the control unit 50 is further configured to control the duct switching device 32 to move to the external recycle position for blocking the second internal port 312, and to control the ventilation device 33 to generate an air flow 100 in the ventilation duct 31 from the first internal port 311 toward the external port 313. Thus, the air flow 100 in the ventilation duct 31 flows to the exterior of the passenger cabin with the waste heat from the heat generating component 34 for generating electricity via a conventional thermoelectric converter (not shown). Alternatively, when it is further determined that the temperature of the heat generating component 34 is lower than the low temperature limit, the control unit 50 is further configured to disable the ventilation device 33 such that there is no air flow in the ventilation duct 31.

Figure 5:
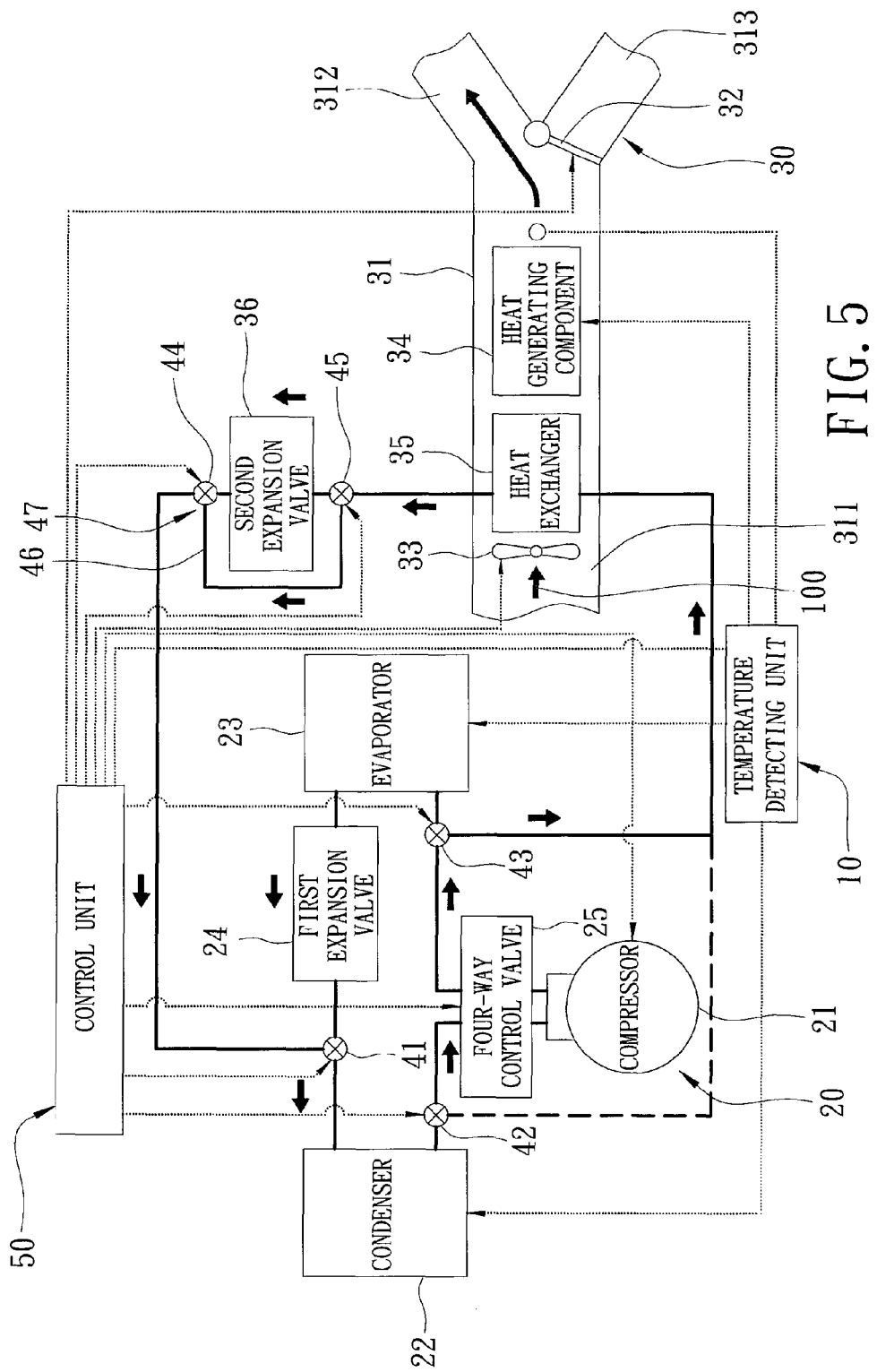
FIG. 5 is the schematic block diagram of FIG. 1 illustrating the air conditioning system operating in a cabin heating mode for heating the passenger cabin and the heat generating component.

In the cabin heating mode, when the control unit 50 determines from the temperature detection results from the temperature detecting unit 10 that the temperature of the heat generating component 34 is lower than the low temperature limit, the control unit 50 is configured to control the cabin air conditioning unit 20, the heat management unit 30, and the switching unit 40 to operate in a component heating function for heating the heat generating component 34 and the passenger cabin. In this function, as shown in FIG. 5, the control unit 50 is configured to control the four-way control valve 25 to direct the coolant flow from the compressor 21 toward the third valve device 43, to control the third valve device 43 to enable the coolant flow from the four-way control valve 25 toward the evaporator 23 and the heat exchanger 35, to control the bypass device 47 to enable the coolant flow from the heat exchanger 35 toward the first valve device 41 through the second expansion valve 36 and the bypass tube 46, to control the first valve device 41 to enable the coolant flow from the evaporator 23 and the bypass device 47 toward the condenser 22, and to control the second valve device 42 to enable the coolant flow from the condenser 22 toward the four-way control valve 25 and to disable the coolant flow between the condenser 22 and the heat exchanger 35. Further, the control unit 50 is also configured to control the duct switching device 32 to move to the internal recycle position for blocking the external port 313, and to control the ventilation device 33 to generate an air flow 100 in the ventilation duct 31 from the first internal port 311 toward the second internal port 312. In this case, the coolant in the cabin air conditioning unit 20 flows into the heat exchanger 35 of the heat management unit 30 such that the heat exchanger 35 is operable to serve as a condenser. Thus, the air flow 100 is used for heating the heat generating component 34 using heat energy of the coolant from the heat exchanger 35, and flows into the passenger cabin for heating the passenger cabin with the rest of the heat energy.

Figure 6:
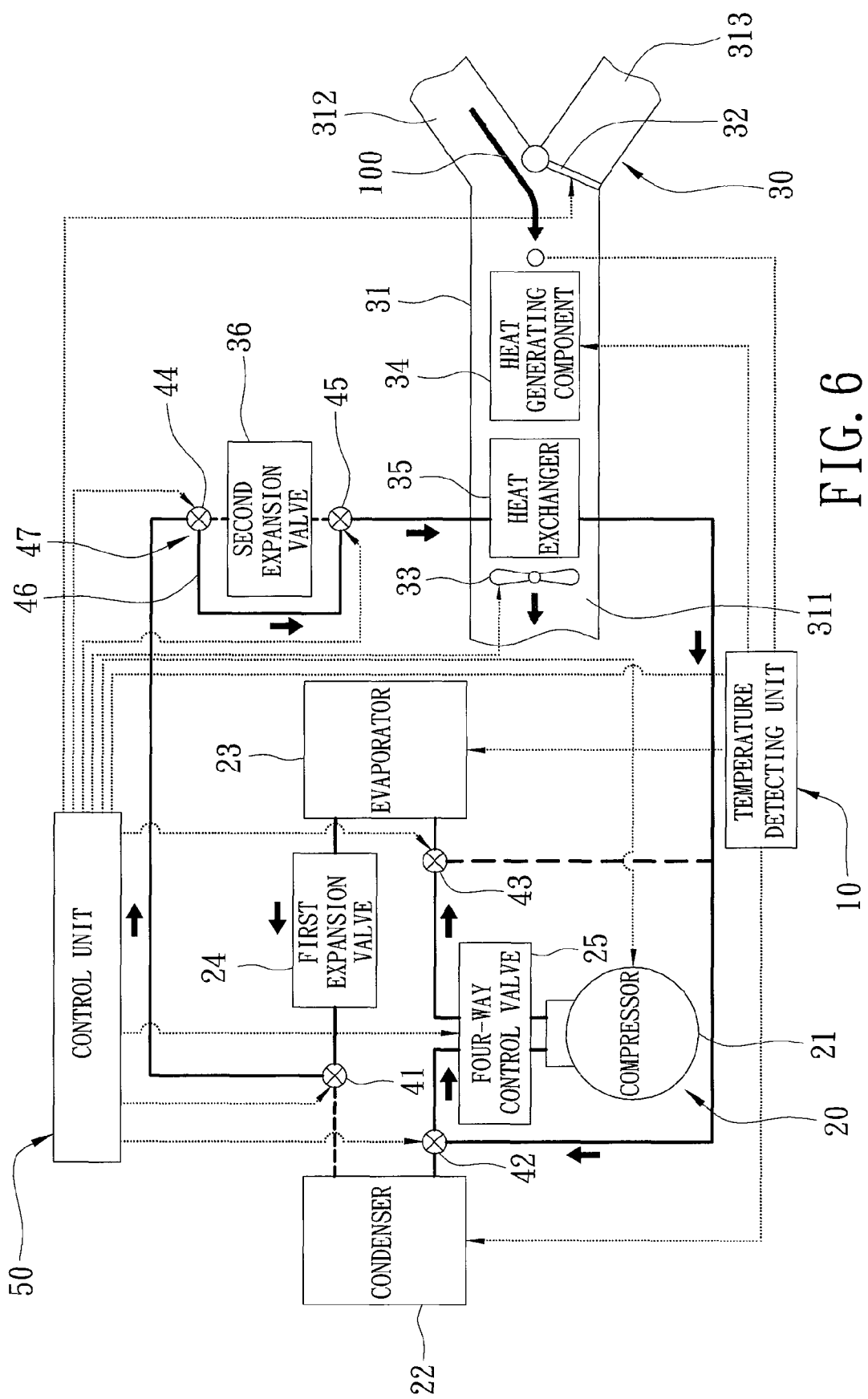
FIG. 6 is the schematic block diagram of FIG. 1 illustrating the air conditioning system operating in the cabin heating mode for heating the passenger cabin and for cooling the heat generating component.

In the cabin heating mode, when the control unit 50 determines that the temperature of the heat generating component is not lower than the high temperature limit, the control unit 50 is configured to control the cabin air conditioning unit 20, the heat management unit 30, and the switching unit 40 to operate in a component cooling function for cooling the heat generating component 34 and for heating the passenger cabin. In this function, as shown in FIG. 6, the control unit 50 is configured to control the four-way control valve 25 to direct the coolant flow from the compressor 21 toward the third valve device 43, to control the third valve device 43 to enable the coolant flow from the four-way control valve 25 toward the evaporator 23 and to disable the coolant flow between the four-way control valve 25 and the heat exchanger 35, to control the first valve device 41 to enable the coolant flow from the evaporator 23 toward the bypass device 47 and to optionally disable the coolant flow between the evaporator 23 and the condenser 22, to control the bypass device 47 to enable the coolant from the first valve device 41 toward the heat exchanger 35 through at least one of the second expansion valve 36 and the bypass tube 46, and to control the second valve device 42 to enable the coolant flow from the heat exchanger 35 toward the four-way control valve 25. Preferably, the control unit 50 is configured to control the first valve device 41 to disable the coolant flow between the condenser 22 and the evaporator 23, and to control the second valve device 42 to disable the coolant flow between the condenser 22 and the four-way control valve 25. Preferably, the bypass device 47 enables the coolant from the first valve device 41 to flow toward the heat exchanger 35 only through the bypass tube 46.

Moreover, in the component cooling function of the cabin heating mode, when it is further determined that the coolant temperature at the outlet end of the evaporator 23 minus the coolant temperature at the inlet end of the evaporator 23 is lower than the predetermined value, the control unit 50 is further configured to control the duct switching device 32 to move to the internal recycle position for blocking the external port 313, and to control the ventilation device 33 to generate an air flow 100 in the ventilation duct 31 from the second internal port 312 toward the first internal port 311 as shown in FIG. 6. Alternatively, when it is further determined that the coolant temperature at the outlet end of the evaporator 23 minus the coolant temperature at the inlet end of the evaporator 23 is not lower than the predetermined value, the control unit 50 is further configured to control the duct switching device 32 to move to the internal recycle position for blocking the external port 313, and to control the ventilation device 33 to generate an air flow 100 in the ventilation duct 31 from the first internal port 311 toward the second internal port 312. In these two cases, the coolant in the cabin air conditioning unit 20 flows into the heat exchanger 35 of the heat management unit 30 such that the heat exchanger 35 is operable to serve as an evaporator. Thus, the air flow 100 may take the waste heat from the heat generating component 34 to the heat exchanger 35 and the coolant in the heat exchanger 35 may take the waste heat away (see FIG. 6), or the heat exchanger 35 may cool the air flow 100 for subsequently cooling the heat generating component 34. Further, the air flow 100 is directed into the passenger cabin for heating the passenger cabin using the waste heat from the heat generating component 34.

Figure 7:
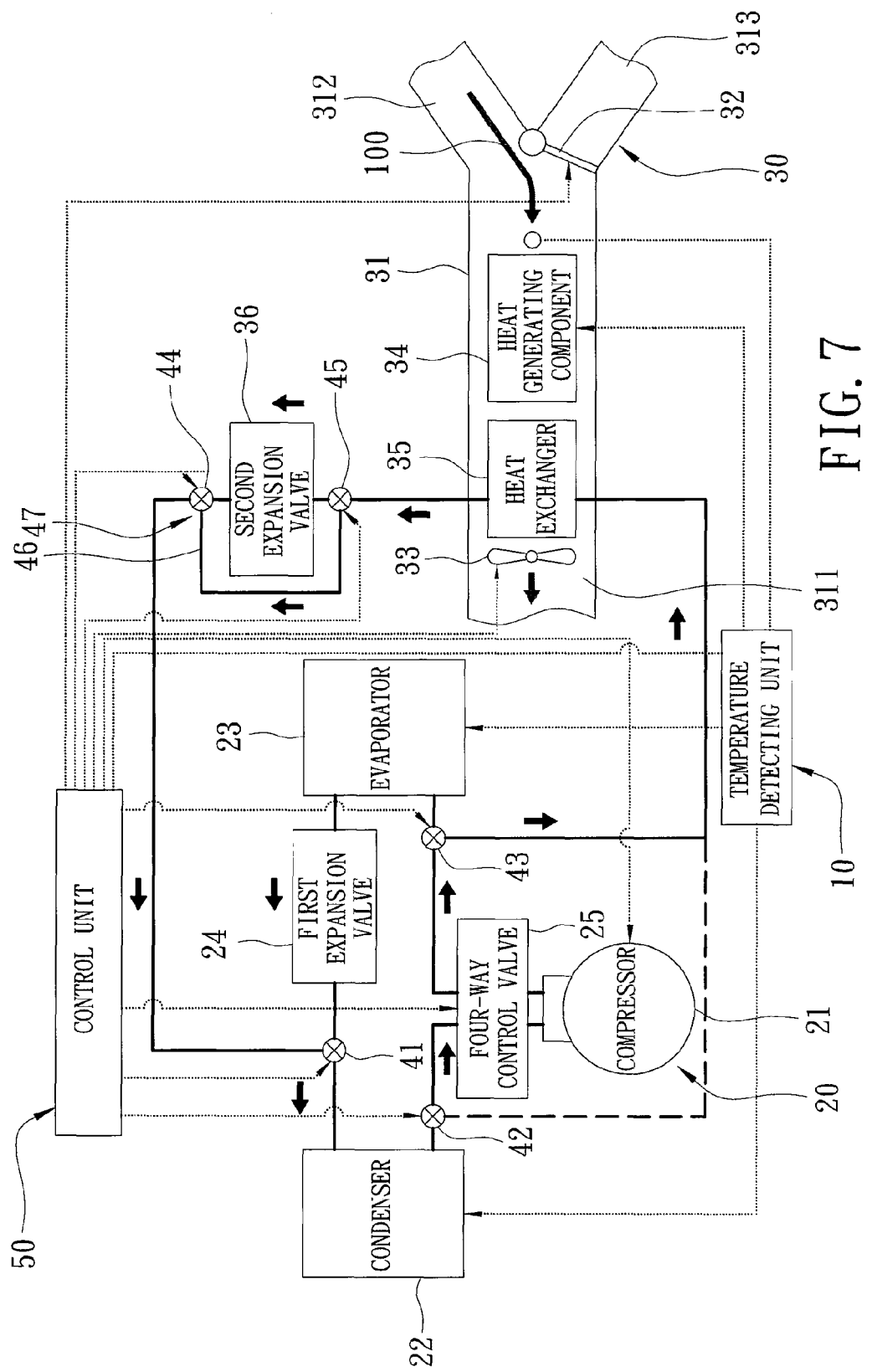
FIG. 7 is the schematic block diagram of FIG. 1 illustrating the air conditioning system operating in a defrosting function of the cabin heating mode for defrosting a condenser of the air conditioning system.

In the cabin heating mode, when the control unit 50 determines that the temperature of the heat generating component 34 is between the low temperature limit and the high temperature limit and that the temperature of a surface of the condenser 22 is not higher than a predetermined temperature value, the control unit 50 is configured to control the cabin air conditioning unit 20, the heat management unit 30, and the switching unit 40 to operate in a defrosting function for defrosting the condenser 22. In this function, as shown in FIG. 7, the control unit 50 is configured to control the four-way control valve 25 to direct the coolant flow from the compressor 21 toward the third valve device 43, to control the third valve device 43 to enable the coolant flow from the four-way control valve 25 toward the evaporator 23 and the heat exchanger 35, to control the bypass device 47 to enable the coolant flow from the heat exchanger 35 toward the first valve device 41 through the bypass tube 46, to control the first valve device 41 to enable the coolant flow from the evaporator 23 and the bypass device 47 toward the condenser 22, and to control the second valve device 42 to enable the coolant flow from the condenser 22 toward the four-way control valve 25 and to disable the coolant flow between the condenser 22 and the heat exchanger 35. The bypass device 47 may optionally enable the coolant flow from the heat exchanger 35 toward the first valve device 41 through the second expansion valve 36 as well. Further, the control unit 50 is also configured to control the duct switching device 32 to move to the internal recycle position for blocking the external port 313, and to control the ventilation device 33 to generate an air flow 100 in the ventilation duct 31 from the second internal port 312 toward the first internal port 311. In the defrosting function of the cabin heating mode, the coolant in the cabin air conditioning unit 20 flows into the heat exchanger 35 of the heat management unit 30 such that the heat exchanger 35 is operable to serve as a condenser, and the air flow 100 in the ventilation duct 31 may take the waste heat from the heat generating component 34 to the coolant in the heat exchanger 35. Thus, the heat exchanger 35 is operable to deliver the coolant with normal or high temperature and high pressure to the condenser 22 so as to defrost the condenser 22. Further, the air flow 100 is directed into the passenger cabin for heating the passenger cabin using the waste heat from the heat generating component 34.

Figure 8:
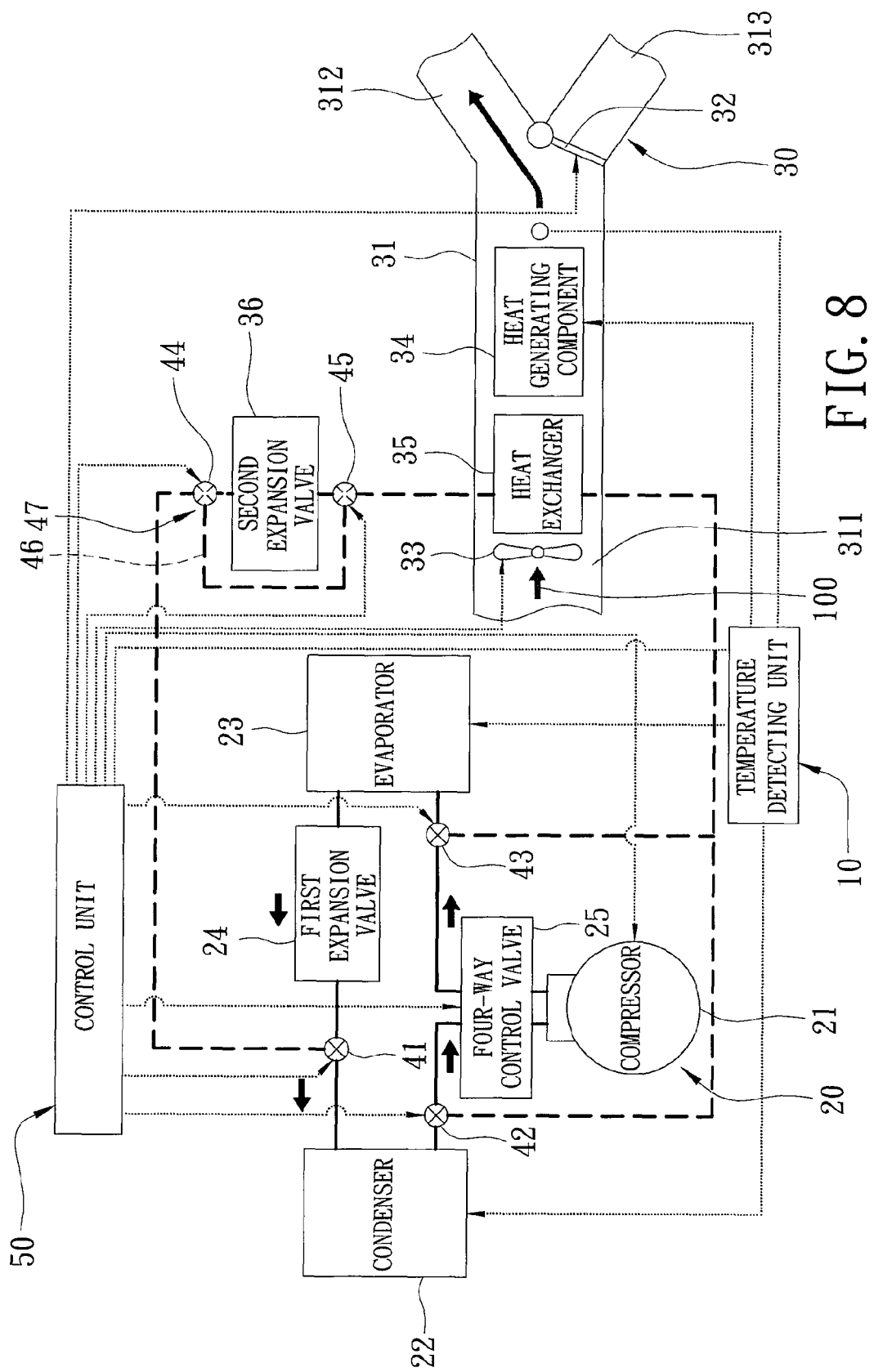
FIG. 8 is the schematic block diagram of FIG. 1 illustrating the air conditioning system operating in the cabin heating mode for heating the passenger cabin.

In the cabin heating mode, when the control unit 50 determines that the temperature of the heat generating component 34 is between the low temperature limit and the high temperature limit and that the temperature of the surface of the condenser 22 is higher than the predetermined temperature value, the control unit 50 is configured to control the cabin air conditioning unit 20, the heat management unit 30, and the switching unit 40 to operate in a cabin heating function for heating the passenger cabin. In this function, as shown in FIG. 8, the control unit 50 is configured to control the four-way control valve 25 to direct the coolant flow from the compressor 21 toward the third valve device 43, to control the third valve device 43 to enable the coolant flow from the four-way control valve 25 toward the evaporator 23 and to disable the coolant flow between the four-way control valve 25 and the heat exchanger 35, to control the first valve device 41 to enable the coolant flow from the evaporator 23 toward the condenser 22 and to disable the coolant flow between the condenser 22 and the heat exchanger 35, and to control the second valve device 42 to enable the coolant flow from the condenser 22 toward the four-way control valve 25 and to disable the coolant flow between the condenser 22 and the heat exchanger 35. Further, the control unit 50 is also configured to control the duct switching device 32 to move to the internal recycle position for blocking the external port 313, and to control the ventilation device 33 to generate an air flow 100 in the ventilation duct 31 from the first internal port 311 toward the second internal port 312 or from the second internal port 312 toward the first internal port 311. In this function, the coolant in the cabin air conditioning unit 20 does not flow into the heat exchanger 35 of the heat management unit 30.

FIGS. 9 to 12 show various functions under the heat management priority mode for prioritizing control of the temperature of the heat generating component 34 over the temperature of the passenger cabin.

Figure 9:
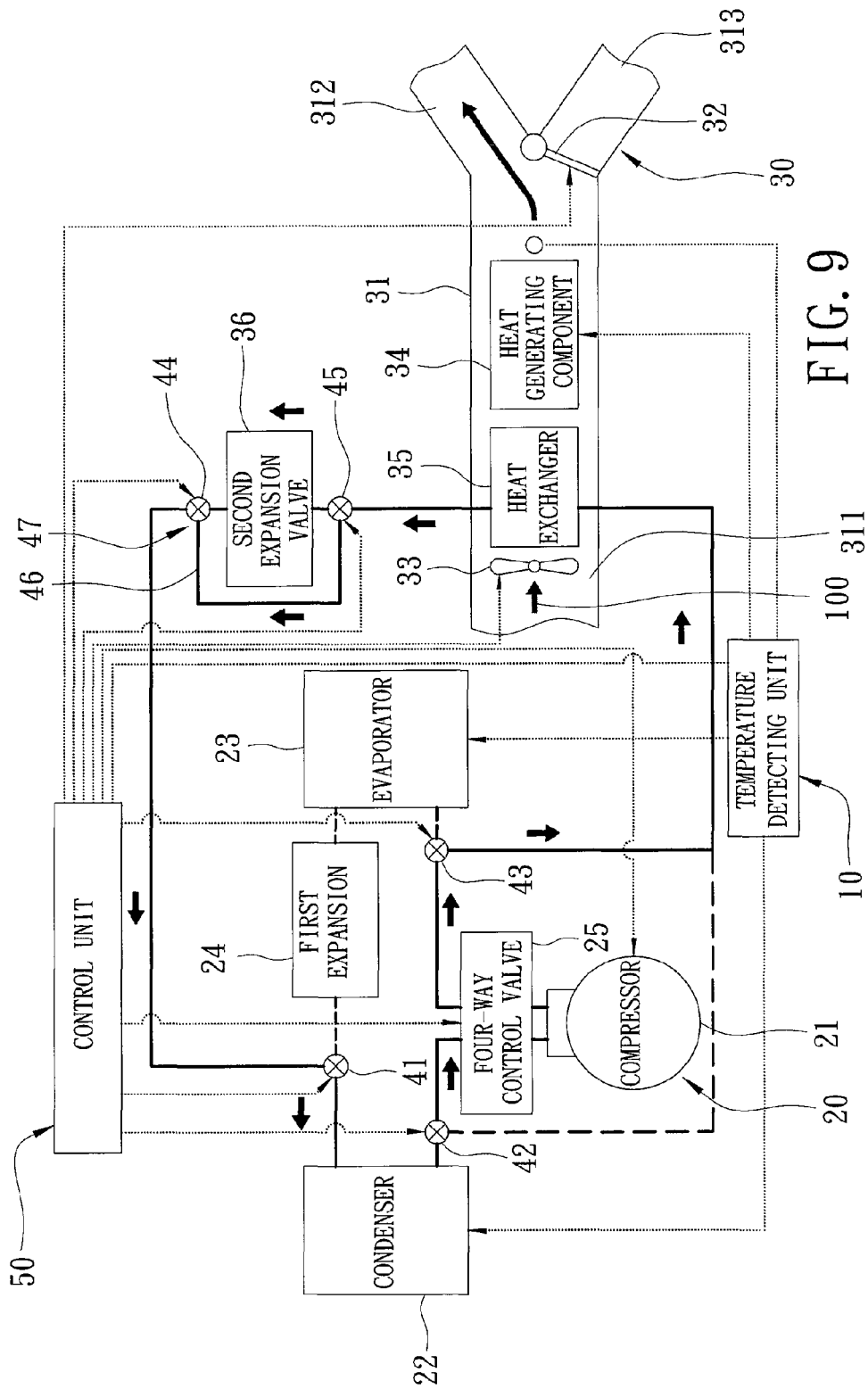
FIGS. 9 and 10 are the schematic block diagram of FIG. 1 illustrating the air conditioning system operating in a component heating function of a heat management priority mode for heating the heat generating component.
Figure 10:
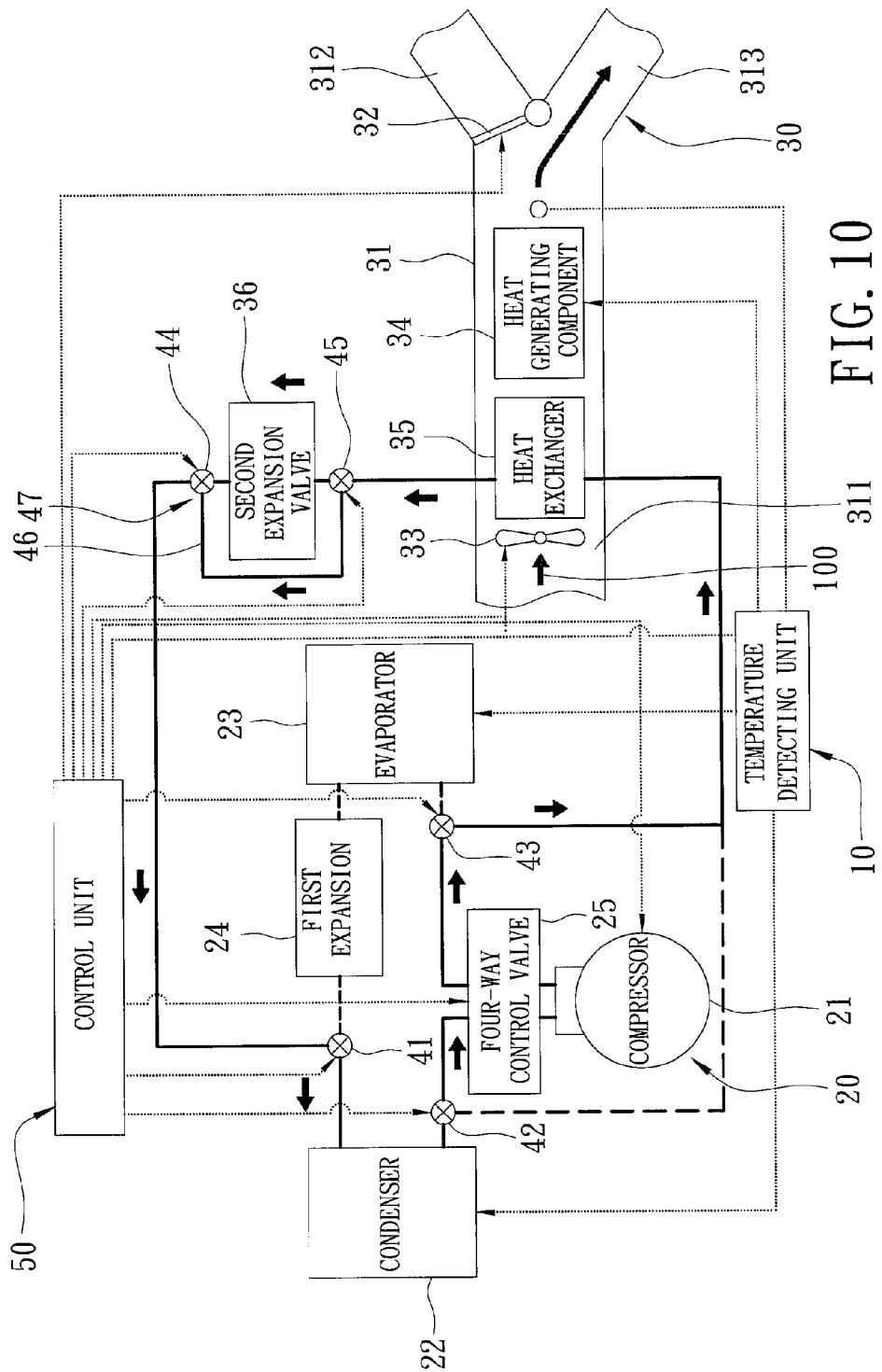

In the heat management priority mode, when the control unit 50 determines from the temperature detection results from the temperature detecting unit 10 that the temperature of the heat generating component 34 is lower than the low temperature limit, the control unit 50 is configured to control the cabin air conditioning unit 20, the heat management unit 30, and the switching unit 40 to operate in a component heating function for heating the heat generating component 34. In this function, as shown in FIGS. 9 and 10, the control unit 50 is configured to control the four-way control valve 25 to direct the coolant flow from the compressor 21 toward the third valve device 43, to control the third valve device 43 to enable the coolant flow from the four-way control valve 25 toward the heat exchanger 35 and to disable the coolant flow between the four-way control valve 25 and the evaporator 23, to control the bypass device 47 to enable the coolant flow from the heat exchanger 35 toward the first valve device 41 through the second expansion valve 36, to control the first valve device 41 to enable the coolant flow from the bypass device 47 toward the condenser 22 and to disable the coolant flow between the condenser 22 and the evaporator 23, and to control the second valve device 42 to enable the coolant flow from the condenser 22 toward the four-way control valve 25 and to disable the coolant flow between the condenser 22 and the heat exchanger 35. The bypass device 47 may optionally enable the coolant flow from the heat exchanger 35 toward the first valve device 41 through the bypass tube 46 as well.

Referring to FIG. 9, in the component heating function of the heat management priority mode, when the control unit 50 further determines that the temperature of the passenger cabin is lower than a predetermined cabin temperature value and that the temperature in the ventilation duct 31 is higher than the temperature of the passenger cabin, the control unit 50 is further configured to control the duct switching device 32 to move to the internal recycle position for blocking the external port 313 and to control the ventilation device 33 to generate an air flow 100 in the ventilation duct 31 from the first internal port 311 toward the second internal port 312. In this case, the air flow 100 in the ventilation duct 31 is used for heating the heat generating component 34 using the heat energy of the coolant in the heat exchanger 35, and flows into the passenger cabin for heating the passenger cabin with the rest of the heat energy.

Referring to FIG. 10, in the component heating function of the heat management priority mode, when the control unit 50 further determines that the temperature of the passenger cabin is lower than the predetermined cabin temperature value and that the temperature in the ventilation duct 31 is not higher than the temperature of the passenger cabin, or that the temperature of the passenger cabin is not lower than the predetermined cabin temperature value, the control unit 50 is further configured to control the duct switching device 32 to move to the external recycle position for blocking the second internal port 312 and to control the ventilation device 33 to generate an air flow 100 in the ventilation duct 31 from the first internal port 311 toward the external port 313. In this case, the air flow 100 in the ventilation duct 31 is used for heating the heat generating component 34 using the heat energy of the coolant in the heat exchanger 35, and flows to the exterior of the passenger cabin with the rest of the heat energy such that the rest of the heat energy may be used for generating electricity via a conventional thermoelectric converter.

In the component heating function of the heat management priority mode, the coolant in the cabin air conditioning unit 20 flows into the heat exchanger 35 of the heat management unit 30 such that the heat exchanger 35 is operable to serve as a condenser. Thus, the air flow 100 in the ventilation duct 31 is used for heating the heat generating component 34 using the heat energy of the coolant in the heat exchanger 35.

In the heat management priority mode, when the control unit 50 determines that the temperature of the heat generating component 34 is higher than the high temperature limit, the control unit 50 is configured to control the cabin air conditioning unit 20, the heat management unit 30, and the switching unit 40 to operate in a component cooling function for cooling the heat generating component 34. In this function, as shown in FIGS. 11 and 12, the control unit 50 is configured to control the four-way control valve 25 to direct the coolant flow from the compressor 21 toward the second valve device 42, to control the second valve device 42 to enable the coolant flow from the four-way control valve 25 toward the condenser 22 and to disable the coolant flow between the four-way control valve 25 and the heat exchanger 35, to control the first valve device 41 to enable the coolant flow from the condenser 22 toward the bypass device 47 and to disable the coolant flow between the condenser 22 and the evaporator 23, to control the bypass device 47 to enable the coolant flow from the condenser 22 toward the heat exchanger 35 only through the second expansion valve 36, and to control the third valve device 43 to enable the coolant flow from the heat exchanger 35 toward the four-way control valve 25 and to disable the coolant flow between the evaporator 23 and the four-way control valve 25.

Figure 11:
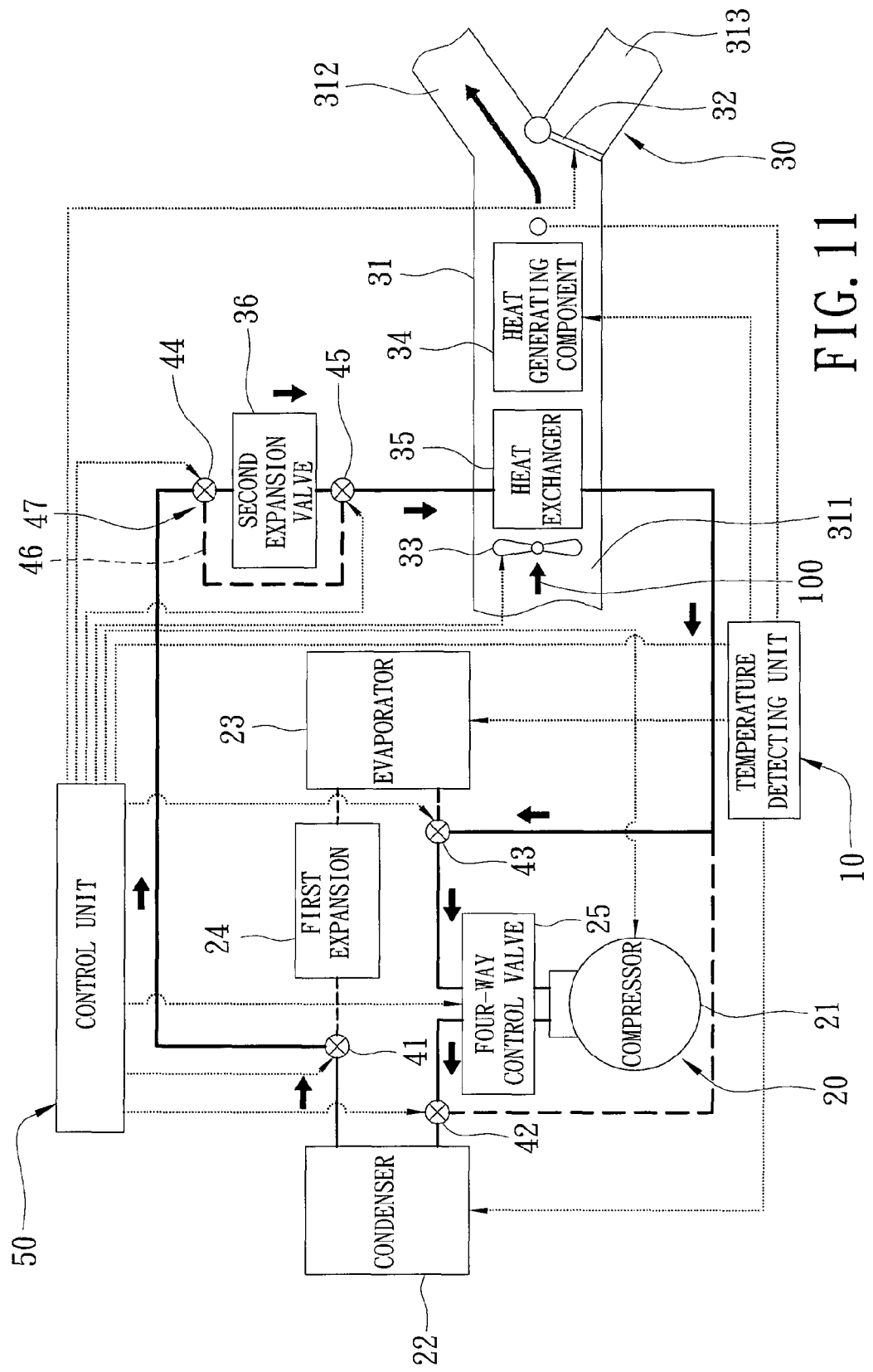
FIGS. 11 and 12 are the schematic block diagram of FIG. 1 illustrating the air conditioning system operating in a component cooling function of the heat management priority mode for cooling the heat generating component.

Referring to FIG. 11, in the component cooling function of the heat management priority mode, when the control unit 50 further determines that the temperature of the passenger cabin is higher than the predetermined cabin temperature value and that the temperature in the ventilation duct 31 is lower than the temperature of the passenger cabin, the control unit 50 is further configured to control the duct switching device 32 to move to the internal recycle position for blocking the external port 313 and to control the ventilation device 33 to generate an air flow 100 in the ventilation duct 31 from the first internal port 311 toward the second internal port 312. In this case, the air flow 100 in the ventilation duct 31 is used for cooling the heat generating component 34, and flows into the passenger cabin for further cooling the passenger cabin. Alternatively, when the control unit 50 further determines that the temperature of the passenger cabin is not higher than the predetermined cabin temperature value and that the temperature in the ventilation duct 31 is higher than the temperature of the passenger cabin, the operation of the air conditioning system is shown to be similar. In this case, the air flow 100 in the ventilation duct 31 is also used for cooling the heat generating component 34, and flows into the passenger cabin for further heating the passenger cabin since the temperature in the ventilation duct 31 is higher than the temperature of the passenger cabin.

Figure 12:
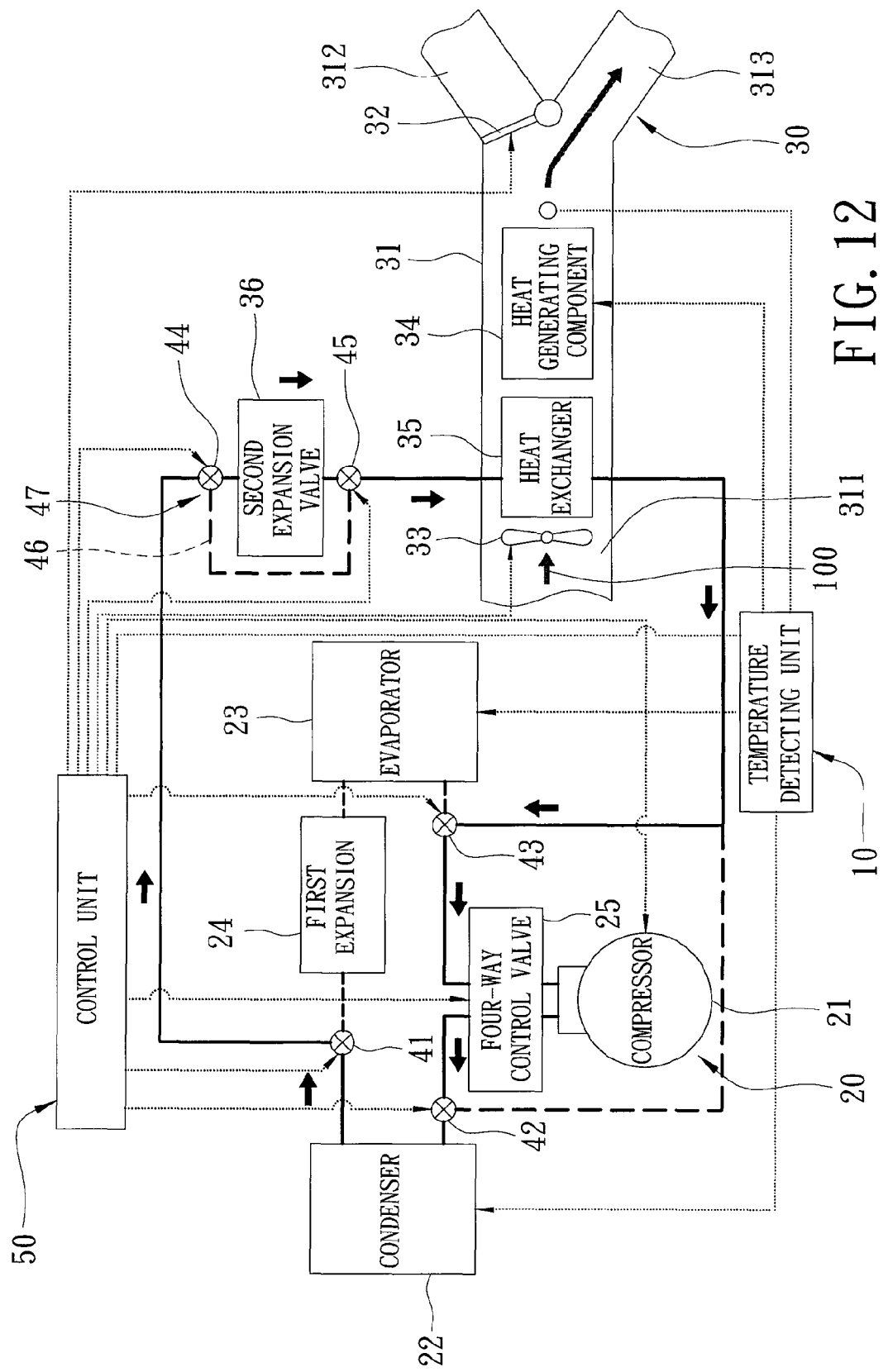

Referring to FIG. 12, in the component cooling function of the heat management priority mode, when the control unit 50 further determines that the temperature of the passenger cabin is higher than the predetermined cabin temperature value and that the temperature in the ventilation duct 31 is not lower than the temperature of the passenger cabin, or that the temperature of the passenger cabin is not higher than the predetermined cabin temperature value and that the temperature in the ventilation duct 31 is not higher than the temperature of the passenger cabin, the control unit 50 is further configured to control the duct switching device 32 to move to the external recycle position for blocking the second internal port 312 and to control the ventilation device 33 to generate an air flow 100 in the ventilation duct 31 from the first internal port 311 toward the external port 313. In this case, the air flow 100 in the ventilation duct 31 is used for cooling the heat generating component 34, and flows to the exterior of the passenger cabin with the waste heat from the heat generating component 34 such that the waste heat may be used for generating electricity via a conventional thermoelectric converter.

In the component cooling function of the heat management priority mode, the coolant in the cabin air conditioning unit 20 flows into the heat exchanger 35 of the heat management unit 30 such that the heat exchanger 35 is operable to serve as an evaporator. Thus, the heat exchanger 35 may cool the air flow 100 in the ventilation duct 31 for subsequently cooling the heat generating component 34.

In summary, in the cabin cooling mode, the air conditioning system of this invention is configured to cool the passenger cabin, and the heat exchanger 35 is operable to serve as an evaporator for cooling the heat generating component 34 under the component cooling function of the cabin cooling mode. In the cabin heating mode, the air conditioning system is configured to heat the passenger cabin, and the heat exchanger 35 is operable to serve as a condenser for defrosting the condenser 22 under the defrosting function and for heating the heat generating component 34 under the component heating function. Moreover, the heat exchanger 35 is operable to serve as an evaporator for cooling the heat generating component 34 under the component cooling function of the cabin heating mode, and the waste heat generated by the heat generating component 34 can be used for heating the passenger cabin. In the heat management priority mode, the air conditioning system is configured to prioritize control of the temperature of the heat generating component 34 over the temperature of the passenger cabin. The heat exchanger 35 is operable to serve as a condenser for heating the heat generating component 34 under the component heating function of the heat management priority mode, and to serve as an evaporator for cooling the heat generating component 34 under the component cooling function of the heat management priority mode. Moreover, in the heat management priority mode, the waste heat generated by the heat generating component 34 can be used for assisting in heating the passenger cabin, and the internal recycling air flow can be used for assisting in cooling the passenger cabin.

Therefore, the air conditioning system according to the present invention is capable of effectively regulating the temperatures of the passenger cabin and the heat generating component 34 simultaneously, and defrosting the condenser 22 in the cabin heating mode. Furthermore, the waste heat generated by the heat generating component 34 can be used for heating the passenger cabin or generating electricity via a conventional thermoelectric converter.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An air conditioning system for a vehicle including a passenger cabin and a heat generating component that generates waste heat during operation thereof, said air conditioning system comprising:
   a cabin air conditioning unit including a compressor, a condenser, an evaporator, a four-way control valve for connecting said compressor to said condenser and said evaporator and for controlling direction of coolant flow through said compressor, and a first expansion valve connected between said condenser and said evaporator for controlling the coolant flow therebetween;
   a heat management unit including
      a ventilation duct formed with spaced apart first and second internal ports in flow communication with the passenger cabin, and an external port spaced apart from said first internal port and in flow communication with an exterior of the passenger cabin,
      a ventilation device disposed adjacent to said first internal port for generating an air flow in said ventilation duct,
      a duct switching device disposed to block air flow through a selected one of said external port and said second internal port,
      a heat exchanger for heat exchange with the air flow in said ventilation duct, and
      a second expansion valve connected between said heat exchanger and said cabin air conditioning unit for controlling the coolant flow therebetween,
      wherein the heat generating component is to be disposed relative to said heat management unit for heat exchange with the air flow in said ventilation duct;
   a temperature detecting unit for detecting at least one of ambient temperature and temperature of at least one of said cabin air conditioning unit, said heat management unit, the heat generating component, and the passenger cabin;
   a switching unit operable to enable and disable coolant flow between at least one pair of said condenser and said evaporator, said condenser and said four-way control valve, said evaporator and said four-way control valve, and said heat exchanger and said cabin air conditioning unit, said switching unit including a bypass device across said second expansion valve to enable coolant flow from said cabin air conditioning unit toward said heat exchanger through at least one of said second expansion valve and said bypass device; and a control unit connected to said cabin air conditioning unit, said heat management unit, said temperature detecting unit and said switching unit, and operable to control operations of said cabin air conditioning unit, said switching unit, and said ventilation device and said duct switching device of said heat management unit according to temperature detection results from said temperature detecting unit.

2. The air conditioning system as claimed in claim 1, wherein said switching unit includes a first valve device connected among said condenser, said evaporator and said heat exchanger, a second valve device connected between said condenser and said four-way control valve, and a third valve device connected among said evaporator, said four-way control valve and said heat exchanger, and wherein, when said control unit determines from the temperature detection results from said temperature detecting unit that the ambient temperature is not lower than a predetermined high temperature value and that the temperature of the heat generating component is not lower than a high temperature limit, said control unit is configured to control said four-way control valve to direct the coolant flow from said compressor toward said second valve device, to control said second valve device to enable the coolant flow from said four-way control valve toward said condenser, to control said first valve device to enable the coolant flow from said condenser toward said evaporator and said heat exchanger, and to control said third valve device to enable the coolant flow from said evaporator and said heat exchanger toward said four-way control valve.

3. The air conditioning system as claimed in claim 2, wherein said heat exchanger is disposed between said ventilation device and said duct switching device, and the heat generating component is to be disposed between said heat exchanger and said duct switching device, and wherein, when said control unit further determines from the temperature detection results from said temperature detecting unit that a difference between coolant temperature at an outlet end of said evaporator and coolant temperature at an inlet end of said evaporator is lower than a predetermined value, said control unit is further configured to control said duct switching device to block said external port, and to control said ventilation device to generate an air flow in said ventilation duct from said second internal port toward said first internal port.

4. The air conditioning system as claimed in claim 2, wherein, when said control unit determines from the temperature detection results from said temperature detecting unit that the ambient temperature is not lower than the predetermined high temperature value and that the temperature of the heat generating component is lower than the high temperature limit, said control unit is configured to control said four-way control valve to direct the coolant flow from said compressor toward said second valve device, to control said second valve device to enable the coolant flow from said four-way control valve toward said condenser, to control said first valve device to enable the coolant flow from said condenser toward said evaporator and to disable the coolant flow between said condenser and said heat exchanger, and to control said third valve device to enable the coolant flow from said evaporator toward said four-way control valve and to disable the coolant flow between said heat exchanger and said four-way control valve.

5. The air conditioning system as claimed in claim 2, wherein said heat exchanger is disposed between said ventilation device and said duct switching device, and the heat generating component is to be disposed between said heat exchanger and said duct switching device, and wherein, when said control unit further determines from the temperature detection results from said temperature detecting unit that a difference between coolant temperature at an outlet end of said evaporator and coolant temperature at an inlet end of said evaporator is not lower than a predetermined value, said control unit is further configured to control said duct switching device to block said second internal port, and to control said ventilation device to generate an air flow in said ventilation duct from said first internal port toward said external port.

6. The air conditioning system as claimed in claim 4, wherein said heat exchanger is disposed between said ventilation device and said duct switching device, and the heat generating component is to be disposed between said heat exchanger and said duct switching device, and wherein, when said control unit further determines from the temperature detection results from said temperature detecting unit that the temperature of the heat generating component is not lower than a low temperature limit, said control unit is further configured to control said duct switching device to block said second internal port, and to control said ventilation device to generate an air flow in said ventilation duct from said first internal port toward said external port.

7. The air conditioning system as claimed in claim 1, wherein said switching unit includes a first valve device connected among said condenser, said evaporator and said heat exchanger, a second valve device connected among said condenser, said four-way control valve and said heat exchanger, and a third valve device connected among said evaporator, said four-way control valve and said heat exchanger, wherein said heat exchanger is disposed between said ventilation device and said duct switching device, and the heat generating component is to be disposed between said heat exchanger and said duct switching device, and wherein, when said control unit determines from the temperature detection results from said temperature detecting unit that the ambient temperature is lower than a predetermined low temperature value and that the temperature of the heat generating component is lower than a low temperature limit, said control unit is configured to control said four-way control valve to direct the coolant flow from said compressor toward said third valve device, to control said third valve device to enable the coolant flow from said four-way control valve toward said evaporator and said heat exchanger, to control said first valve device to enable the coolant flow from said evaporator and said heat exchanger toward said condenser, to control said second valve device to enable the coolant flow from said condenser toward said four-way control valve and to disable the coolant flow between said condenser and said heat exchanger, to control said duct switching device to block said external port, and to control said ventilation device to generate an airflow in said ventilation duct from said first internal port toward said second internal port.

8. The air conditioning system as claimed in claim 7, wherein, when said control unit determines from the temperature detection results from said temperature detecting unit that the ambient temperature is lower than the predetermined low temperature value and that the temperature of the heat generating component is not lower than a high temperature limit, said control unit is configured to control said four-way control valve to direct the coolant flow from said compressor toward said third valve device, to control said third valve device to enable the coolant flow from said four-way control valve toward said evaporator and to disable the coolant flow between said four-way control valve and said heat exchanger, to control said first valve device to enable the coolant flow from said evaporator toward said heat exchanger and to disable the coolant flow between said evaporator and said condenser, and to control said second valve device to enable the coolant flow from said heat exchanger toward said four-way control valve and to disable the coolant flow between said condenser and said four-way control valve.

9. The air conditioning system as claimed in claim 8, wherein, when said control unit further determines from the temperature detection results from said temperature detecting unit that a difference between coolant temperature at an outlet end of said evaporator and coolant temperature at an inlet end of said evaporator is lower than a predetermined value, said control unit is further configured to control said duct switching device to block said external port, and to control said ventilation device to generate an air flow in said ventilation duct from said second internal port toward said first internal port.

10. The air conditioning system as claimed in claim 8, wherein, when said control unit further determines from the temperature detection results from said temperature detecting unit that a difference between coolant temperature at an outlet end of said evaporator and coolant temperature at an inlet end of said evaporator is not lower than a predetermined value, said control unit is further configured to control said duct switching device to block said external port, and to control said ventilation device to generate an air flow in said ventilation duct from said first internal port toward said second internal port.

11. The air conditioning system as claimed in claim 7, wherein, when said control unit determines from the temperature detection results from said temperature detecting unit that the ambient temperature is lower than the predetermined low temperature value, that the temperature of the heat generating component is between the low temperature limit and a high temperature limit, and that the temperature of said condenser is not higher than a predetermined temperature value, said control unit is configured to control said four-way control valve to direct the coolant flow from said compressor toward said third valve device, to control said third valve device to enable the coolant flow from said four-way control valve toward said evaporator and said heat exchanger, to control said first valve device to enable the coolant flow from said evaporator and said heat exchanger toward said condenser, to control said second valve device to enable the coolant flow from said condenser toward said four-way control valve and to disable the coolant flow between said condenser and said heat exchanger, to control said duct switching device to block said external port, and to control said ventilation device to generate an air flow in said ventilation duct from said second internal port toward said first internal port.

12. The air conditioning system as claimed in claim 7, wherein, when said control unit determines from the temperature detection results from said temperature detecting unit that the ambient temperature is lower than the predetermined low temperature value, that the temperature of the heat generating component is between the low temperature limit and a high temperature limit, and that the temperature of said condenser is higher than a predetermined temperature value, said control unit is configured to control said four-way control valve to direct the coolant flow from said compressor toward said third valve device, to control said third valve device to enable the coolant flow from said four-way control valve toward said evaporator and to disable the coolant flow between said four-way control valve and said heat exchanger, to control said first valve device to enable the coolant flow from said evaporator toward said condenser and to disable the coolant flow between said condenser and said heat exchanger, and to control said second valve device to enable the coolant flow from said condenser toward said four-way control valve and to disable the coolant flow between said condenser and said heat exchanger.

13. The air conditioning system as claimed in claim 1, wherein said switching unit is configured to enable coolant flow between said condenser and said heat exchanger, between said heat exchanger and said four-way control valve, and between said four-way control valve and said condenser, and to disable coolant flow between said condenser and said evaporator; and wherein, when said control unit determines from the temperature detection results from said temperature detecting unit that the temperature of the heat generating component is lower than a low temperature limit, said control unit is configured to control said four-way control valve to direct the coolant flow from said compressor to flow in sequence through said heat exchanger, said condenser and back to said compressor through said four-way control valve.

14. The air conditioning system as claimed in claim 13, wherein:

said heat exchanger is disposed between said ventilation device and said duct switching device, and the heat generating component is to be disposed between said heat exchanger and said duct switching device; and when said control unit further determines from the temperature detection results from said temperature detecting unit that the temperature of the passenger cabin is lower than a predetermined cabin temperature value and that the temperature in said ventilation duct is higher than the temperature of the passenger cabin, said control unit is further configured to control said duct switching device to block said external port and to control said ventilation device to generate an air flow in said ventilation duct from said first internal port toward said second internal port.

15. The air conditioning system as claimed in claim 13, wherein:

said heat exchanger is disposed between said ventilation device and said duct switching device, and the heat generating component is to be disposed between said heat exchanger and said duct switching device; and when said control unit further determines from the temperature detection results from said temperature detecting unit that the temperature of the passenger cabin is lower than a predetermined cabin temperature value and that the temperature in said ventilation duct is not higher than the temperature of the passenger cabin, said control unit is further configured to control said duct switching device to block said second internal port and to control said ventilation device to generate an air flow in said ventilation duct from said first internal port toward said external port.

16. The air conditioning system as claimed in claim 13, wherein:
    said heat exchanger is disposed between said ventilation device and said duct switching device, and the heat generating component is to be disposed between said heat exchanger and said duct switching device; and
    when said control unit further determines from the temperature detection results from said temperature detecting unit that the temperature of the passenger cabin is not lower than a predetermined cabin temperature value, said control unit is further configured to control said duct switching device to block said second internal port and to control said ventilation device to generate an air flow in said ventilation duct from said first internal port toward said external port.

17. The air conditioning system as claimed in claim 1, wherein said switching unit is configured to enable coolant flow between said condenser and said heat exchanger, between said heat exchanger and said four-way control valve, and between said four-way control valve and said condenser, and to disable coolant flow between said condenser and said evaporator; and
    when said control unit determines from the temperature detection results from said temperature detecting unit that the temperature of the heat generating component is higher than a high temperature limit,
    said control unit is configured to control said four-way control valve to direct the coolant flow from said compressor to flow in sequence through said condenser, said heat exchanger and back to said compressor via said four-way control valve.

18. The air conditioning system as claimed in claim 17, wherein said heat exchanger is disposed between said ventilation device and said duct switching device, and the heat generating component is to be disposed between said heat exchanger and said duct switching device; and
    wherein, when said control unit further determines from the temperature detection results from said temperature detecting unit that the temperature of the passenger cabin is higher than a predetermined cabin temperature value and that the temperature in said ventilation duct is lower than the temperature of the passenger cabin, or that the temperature of the passenger cabin is not higher than the predetermined cabin temperature value and that the temperature in said ventilation duct is higher than the temperature of the passenger cabin,
    said control unit is further configured to control said duct switching device to block said external port and to control said ventilation device to generate an air flow in said ventilation duct from said first internal port toward said second internal port.

19. The air conditioning system as claimed in claim 17, wherein said heat exchanger is disposed between said ventilation device and said duct switching device, and the heat generating component is to be disposed between said heat exchanger and said duct switching device; and
    wherein, when said control unit further determines from the temperature detection results from said temperature detecting unit that the temperature of the passenger cabin is higher than a predetermined cabin temperature value and that the temperature in said ventilation duct is not lower than the temperature of the passenger cabin, or that the temperature of the passenger cabin is not higher than the predetermined cabin temperature value and that the temperature in said ventilation duct is not higher than the temperature of the passenger cabin,
    said control unit is further configured to control said duct switching device to block said second internal port and to control said ventilation device to generate an air flow in said ventilation duct from said first internal port toward said external port.

* * * * *